United States Patent
Chauhan et al.

(10) Patent No.: US 11,895,579 B2
(45) Date of Patent: *Feb. 6, 2024

(54) SYSTEM AND METHOD OF WI-FI OFFLOAD IN MULTI-SIM DEVICES

(71) Applicant: JIO PLATFORMS LIMITED, Ahmedabad (IN)

(72) Inventors: Devesh Chauhan, Navi Mumbai (IN); Vinita Kaushik, Navi Mumbai (IN); Hiren Patel, Navi Mumbai (IN); Abhilash Shrivastava, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 43 days.

This patent is subject to a terminal disclaimer.

(21) Appl. No.: 17/566,967

(22) Filed: Dec. 31, 2021

(65) Prior Publication Data

US 2022/0124611 A1 Apr. 21, 2022

Related U.S. Application Data

(63) Continuation of application No. 17/008,287, filed on Aug. 31, 2020, now Pat. No. 11,218,957.

(30) Foreign Application Priority Data

Aug. 29, 2019 (IN) .............................. 201921034862

(51) Int. Cl.
*H04W 48/18* (2009.01)
*H04W 8/18* (2009.01)
(Continued)

(52) U.S. Cl.
CPC ......... *H04W 48/18* (2013.01); *H04M 1/0277* (2013.01); *H04W 8/183* (2013.01); *H04W 12/06* (2013.01); *H04W 88/06* (2013.01)

(58) Field of Classification Search
CPC ... H04W 48/18; H04W 48/183; H04W 12/06; H04W 88/06; H04W 28/08; H04M 1/0277; H04L 63/0853
See application file for complete search history.

(56) References Cited

U.S. PATENT DOCUMENTS 11,218,957 B2 1/2022 Chauhan et al.
2014/0351880 A1* 11/2014 Low ...................... H04W 12/00
726/1

(Continued)

FOREIGN PATENT DOCUMENTS

CA 2945848 3/2019

*Primary Examiner* — Yuwen Pan
*Assistant Examiner* — Angelica M Perez
(74) *Attorney, Agent, or Firm* — Klarquist Sparkman, LLP (57) ABSTRACT

A system and method for automatic offload in multi SIM devices. The system comprises a learning module [108] to learn the SIM slot ID of the inserted desired operator, the structure alignment and field information, wherein feedback of the learnt information is provided to the network server [114]. A method selection module [110] analyzes the structure alignment and field information for mapping unique connection methods to different devices. A WiFi configuration and connection module [112] uses appropriate WiFi configuration and attempts connection to desired Service Providers enterprise Wi-Fi AP using the determined connection method.

11 Claims, 8 Drawing Sheets

(51) Int. Cl.
    *H04M 1/02*     (2006.01)
    *H04W 12/06*     (2021.01)
    *H04W 88/06*     (2009.01)

(56) References Cited

U.S. PATENT DOCUMENTS

2016/0134613 A1*   5/2016   Rong ................ H04L 63/08
                                                                   726/7
2016/0345203 A1*  11/2016   Lim ............... H04W 28/0838
2018/0091581 A1*   3/2018   Yu .................. H04L 67/1095
2018/0227752 A1*   8/2018   Teyeb ................. H04W 12/06
2021/0068048 A1    3/2021   Chauhan et al.

* cited by examiner

SYSTEM AND METHOD OF WI-FI OFFLOAD IN MULTI-SIM DEVICES

CROSS REFERENCE TO RELATED APPLICATIONS

This application is a continuation of U.S. patent application Ser. No. 17/008,287 filed Aug. 31, 2020, issuing as U.S. Pat. No. 11,218,957, which claims priority to Indian Patent Application No. 201921034862, filed Aug. 29, 2019, all of which are hereby incorporated by reference herein.

TECHNICAL FIELD

The technical field generally relates to the field of wireless network and more particularly to a system and method for Wi-Fi offload.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In a traditional cellular deployment, suitable powered macrocells are being deployed to cover sufficiently large areas. However, this macrocells only deployment, generally suffers from quick capacity degradation as the number of user equipment (UE) operating in the macrocells coverage areas increase. Therefore, operators are now reinforcing their macrocells deployment with one or multiple low powered small cellular cells (generally termed as Femto/Pico/Micro cells) placed at multiple strategic locations within one or more macro coverage areas. This kind of reinforced cellular network is generally termed as Heterogeneous network, in short, HetNet.

For a typical HetNet, strategic locations for small cells generally include areas with a high density of users, such as shopping malls, airports, railway/bus stations, colleges, etc. Also, these locations might include an area with dead-spots, or areas with low macro signal strength, such as indoor establishments or peripheral locations of a macro coverage area. Reinforced with small cells placed at multiple strategic locations as described above, Heterogeneous Networks not only provide the increased mobile data capacity but also provide better mobile coverage, thereby enhancing the overall user's mobile broadband experience.

In recent years, Wi-Fi technology based on IEEE 802.11 standards has also seen tremendous growth and commercialization. Almost all available UE (user equipment) with cellular capability support have now Wi-Fi capability by default in order to connect to Wi-Fi networks operating in either of the unlicensed frequency bands, 2.4 GHz, or 5 GHz. The fact, therefore, is also motivating cellular operators to use ubiquitous and cost-effective Wi-Fi technology in pursuing their HetNet strategy. Many operators are now deploying low powered Wi-Fi cells along with cellular small cells at multiple strategic locations identified for a HetNet. Further, for ease of maintenance and provision, few operators are also using Wi-Fi integrated versions of small cellular cells, wherein a Wi-Fi and cellular small cell technology are made available on common equipment.

Also, an Access Network Detection and Selection Function (ANDSF) is defined by 3GPP for autonomous LTE/Cellular Network to WLAN (and vice versa) data/voice offload. The client-server architecture of the ANDSF is aimed to realize seamless Wi-Fi offload for improving customer experience through connection with a good quality Wi-Fi and at the same time as an effective tool for decongestion of operator LTE/Cellular network. Further, the ANDSF provides functionality to operators to define centralized policies for offloading to operator-preferred network connections. The ANDSF server assists the user equipment (UE) to discover operator Wi-Fi networks through an ANDSF client residing on it. The ANDSF client automatically enables a mobile user's data and voice to be offloaded from LTE/Cellular Network to Wi-Fi and vice-versa based on these defined policies. Further, a typical policy defined at the server has a list of access technology type for e.g. Wi-Fi, preferred Wi-Fi radio access identifier—the Service Set Identifier (SSID) which is simply the name of the Wi-Fi network and list of mobile operator network cell IDs as a possible source of Wi-Fi offload destination. The ANDSF client makes use of a background Wi-Fi scans from an Operating System (OS) of the user device and takes a decision to automatically offload on policy preferred SSID if in an acceptable range. Also, as an alternative, the ANDSF client can periodically check if the user is in the expected network Cell ID coverage, turns ON Wi-Fi on the device and attempts to connect to preferred SSID if in an acceptable range.

The ANDSF server assists the user equipment (UE) to discover operator Wi-Fi networks through a Wi-Fi Connection Manager Client (client) residing on it. The client automatically enables a mobile user's data and voice to be offloaded from LTE/Cellular Network to Wi-Fi and vice-versa based on these defined policies or can dynamically identify and connect with different Wi-Fi access network names that are connectable within the operator network. A mobile network operator can deploy an enterprise Wi-Fi solution to augment the LTE/cellular network. The enterprise Wi-Fi solution can make use of EAP-AKA (Extensible Authentication Protocol (EAP)—mechanism for authentication and session key distribution that uses the third generation Authentication and Key Agreement (AKA) algorithm which typically runs in the SIM. Furthermore, presently some known ANDSF solutions are available, but these known solutions have various limitations that make them unfit in certain deployment scenarios as explained below.

Figure 4:
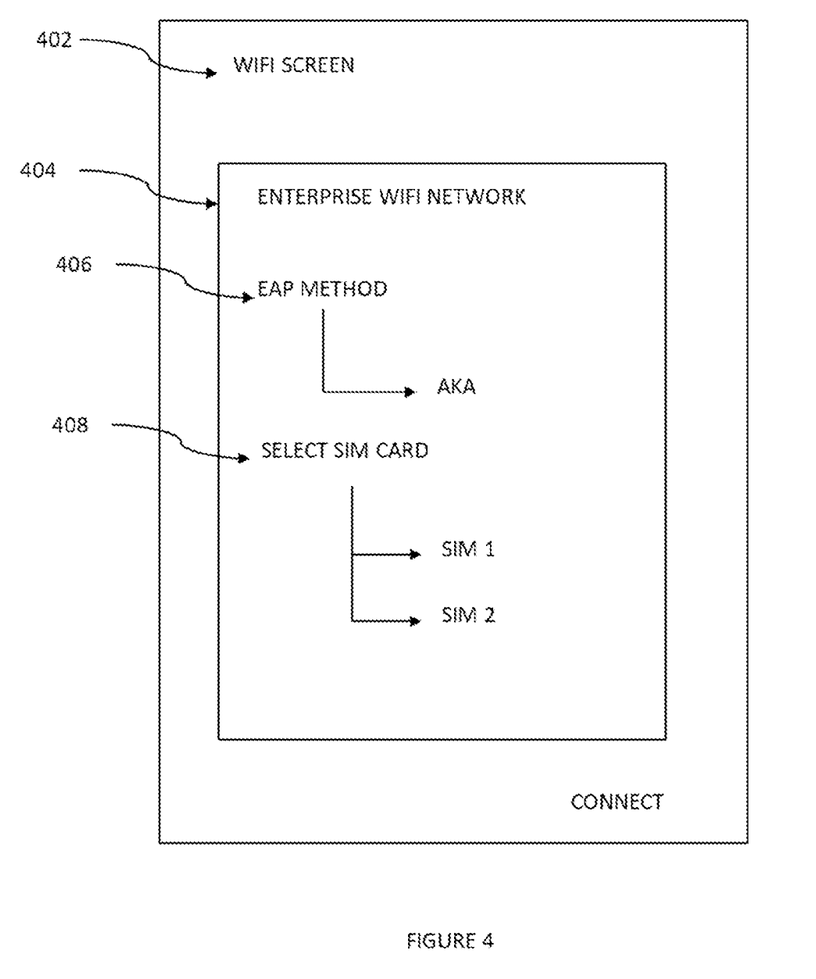
FIG. 4 illustrates an exemplary WiFi dialogue screen for EAP method and SIM selection.

As also illustrated in FIG. 4, in a multi-SIM device, when the user wants to manually connect to enterprise Wi-Fi APs, the user must do the following:
  Manually turn on Wi-Fi
  Click the desired enterprise Wi-Fi AP
  Long click to connect to configure selected network 404.
  User is presented with Wi-Fi Dialogue screen 402 on which he needs to select:
    EAP method as AKA 406 or AKA'.
    Select SIM card in which desired mobile network operator SIM is inserted 408.

By selecting the appropriate SIM card, the connection is authenticated using EAP-AKA algorithm from the selected SIM card. However, automated Wi-Fi offload in Multi-SIM devices, with parent Service Provider's SIM slot 1 or SIM slot 2 is not feasible by the present standard ADNSF functionality. To provide seamless offload, there is a need to create a solution that overcomes this limitation. The novel technique presented in this proposal solves this problem.

Figure 5:
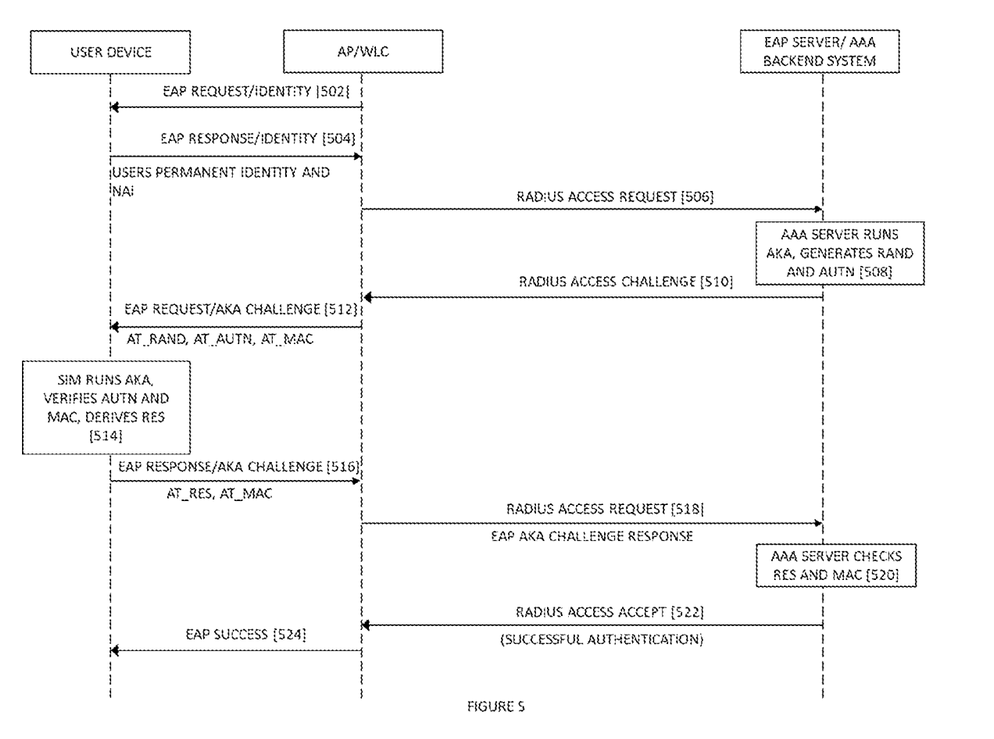
FIG. 5 illustrates an exemplary high level EAP-AKA authentication mechanism between a user device and an authentication server.

IETF, RFC 4187 describes Extensible Authentication Protocol Method for 3rd Generation Authentication and Key Agreement (EAP-AKA). FIG. 5 illustrated high level EAP AKA authentication mechanism between device and authentication server. The UE detects Wi-Fi access point (AP) enabled for desired EAP SSID and associates itself with the Wi-Fi radio network through 802.1x association Request. At 502, the Wi-Fi AP starts with EAP based authentication with UE. It asks for the permanent identity of the user in EAP Identity Request. At 504, the UE responds with its permanent identity (IMSI) stored on the SIM and a Network Access Identifier (NAI) in EAP Identity Response. As per TS23.003, Network Access Identifier (NAI) format is specified containing the IMSI or the pseudonym, as defined for EAP-AKA. The NAI will be in the following form: "0<IMSI>@wlan.epc.mnc<MNC>.mcc<MCC>.3gppnetwork.org", where the leading "0" is used to indicate EAP-AKA authentication. Accordingly, at 506, a radius access request is forwarded to the AAA. At 508, NAI is used by backend AAA node to identify the subscriber and retrieves the authentication vectors, which will be used to authenticate the user. At 510, AAA server starts the actual AKA protocol by sending an EAP-Request/AKA-Challenge message to the UE at 512. The EAP-Request/AKA-Challenge message contains a RAND random number (AT_RAND), a network authentication token (AT_AUTN), and a message authentication code (AT_MAC). If the SIM card on the user device can validate the authentication vectors correctly, the authentication will be successful. The SIM runs the AKA algorithm and verifies AT_AUTN at 514. If this is successful, the device proceeds to send the EAP-Response/AKA-Challenge message at 516, which is forwarded to AAA at 518. This message contains a result (AT_RES) parameter that allows the AAA server in turn to authenticate the client, and the AT_MAC attribute to integrity protect the EAP message. At 520, the AAA server verifies that the AT_RES and the AT_MAC in the EAP-Response/AKA-Challenge packet are correct and sends EAP-Success packet at 522, indicating that the authentication was successful at 524.

There are some known solutions available, but these have limitations that makes them unfit in certain deployment scenarios as explained below. For example, an existing solution discloses radio/cellular network selection procedure (2G/3G/4G) based on the priorities by considering Home or Roaming network for multi SIM's and also system ranking to be done for the SIM's based on configuration as an enhancement to ANDSF but is based on an Artificial Intelligence (AI) based method of selecting appropriate SIM and connection configuration in multi-sim devices while connecting to Service Provider's Enterprise Wi-Fi Access Points using EAP AKA/AKA' authentication for enhancing the customer experience on LTE/Cellular and Wi-Fi networks. Yet another existing solution discloses access selection procedure between the Cellular network (3GPP) and Wi-Fi network or Partners Wi-Fi network (Non-3GPP) and further bifurcating them based on the RAT Type on Cellular side (LTE/UMTS/2G) based on the Cellular network signal strength or WIFI side using ANDSF/HS 2.0. The current disclosure is related to detecting location, accuracy or updating location accuracy of Wi-Fi access points, while our solution is learning (AI) based method of selecting appropriate SIM and connection configuration in multi-sim devices while connecting to Service Provider's Enterprise Wi-Fi Access Points using EAP AKA/AKA' authentication for enhancing the customer experience on LTE/Cellular and Wi-Fi networks.

Yet another existing solution discloses how a UE utilizes ANDSF policies to select the WLAN. The above stated prior art uses information passed on by the UE to different network nodes like ANDSF Server, Wi-Fi Controller, or RAN to dynamically create policies such as location-based policies, or a network neighborhood map of to identify AP proximity or associating Wi-Fi AP with RAN cell for optimizing mobility and further based on this select the PLMN by means of network selection module and communication module (which are part of transceiver module). However, in the current disclosure, the method of selecting appropriate SIM and connection configuration in multi-sim devices while connecting to Service Provider's Enterprise Wi-Fi Access Points using EAP AKA/AKA' authentication for enhancing the customer experience on LTE/Cellular and Wi-Fi networks is disclosed which is different from the above prior art.

Yet another existing solution discloses enhanced network selection rules to evaluate the condition and make a decision as to transition from a first wireless communication network to a second wireless communication network with the help of client module and network discovery module on the ANDSF server. However, in the current disclosure, the method of selecting appropriate SIM and connection configuration in multi-sim devices while connecting to Service Provider's Enterprise Wi-Fi Access Points using EAP AKA/AKA' authentication for enhancing the customer experience on LTE/Cellular and Wi-Fi networks is disclosed which is different from the above prior art.

Yet another existing solution discloses dynamic authentication of network operators through a connectivity engine in the UE for a device with a plurality of SIMs. The above stated prior art related to the dynamic network operator selection system in Multi SIM devices. i.e. relates to connection management for multi operator selection. The dynamic network operator selection has been described with an example provided for DSDS/DSDA devices, where the operator selection (single radio or both) is driven by a connection manager/connectivity engine. Dynamic selection of operators and/or RATs is based on following conditions like cost, network coverage, network congestion, network interference, unified billing, quality of service, bandwidth, WiFi efficiency and/or device power consumption, policy based an operator selection based on time-of-day and operator selection based on a per-application operation specification. However, in the current disclosure, the method of selecting appropriate SIM and connection configuration in multi-sim devices while connecting to Service Provider's Enterprise Wi-Fi Access Points using EAP AKA/AKA' authentication for enhancing the customer experience on LTE/Cellular and Wi-Fi networks is disclosed which is different from the above prior art.

In general, all the above known solutions have the limitation of not providing solution to the problem of dynamically identifying the right SIM and connection configuration in multi sim devices. There is no solution that can dynamically provide method of selecting appropriate SIM and connection configuration in multi-sim devices while connecting to Service Provider's Enterprise Wi-Fi Access Points using EAP AKA/AKA' authentication for enhancing the customer experience on LTE/Cellular and Wi-Fi networks.

Issues Concerning with the Existing Approaches:

These implementations though simple, have major limitations for a service provider as listed below. A service operator network typically has thousands of device models, majority of which are dual-SIM/multi-SIM devices. The user can insert the parent service provider SIM which is providing Wi-Fi offload, in either of the SIM slots i.e. SIM slot 1 or SIM slot 2. Service provider's enterprise Wi-Fi network is typically deployed in all public places to serve public Wi-Fi to customers. It radiates a common SSID from all the Access Points and uses EAP-AKA based automated authentication mechanism using service provider credentials from the SIM in the Phone. Any customer of a service provider can attach to its service provider's Enterprise Wi-Fi.

In automated Wi-Fi offload solutions, the Wi-Fi Offload is done on a common pre-defined SSID(s) for Enterprise Wi-Fi AP's. This common SSID is pushed into the client in the phone through the ANDSF server and the client connects to this Enterprise Wi-Fi SSID automatically whenever it is in its coverage.

For connection to parent Service Provider's Enterprise Wi-Fi AP, the option to select the SIM card is different in different multi SIM mobile devices. For example, in some Original Equipment Manufacturers (OEMs), the user is presented with option to choose between the SIMs, whereas in some other OEMs, the user is directly presented with an option of mobile operator name while in some other cases, the user is not presented with any option to select SIM card but is taken care internally. Hence from this, it is evident that the device OEMs are customizing the input dialogue presented to the user for Manual EAP-AKA selection. Now, when the WiFi Multi-SIM Connection Manager Client needs to automatically turn on Wi-Fi and connect with desired enterprise network, the challenge lies in automatically configuring the SIM settings for different device OEMs, irrespective of operating systems, since they are personalized differently.

Another issue observed is that in some devices, OEMs have configured SIM EAP-AKA settings erroneously in multi SIM devices, which means that if desired network operator SIM is in a slot other than the primary slot and even when the right SIM slot input is provided, the device uses credentials of the primary SIM slot for authentication which results in authentication failure. In some other OEMs, inherent EAP-AKA functionality is supported, but there is no support for SIM card configuration in the Wi-Fi Dialogue box and hence the authentication on such devices will always fail. In both these cases, the WiFi Multi-SIM Connection Manager Client repeatedly tries connecting to desired enterprise network undesirably if the network is available and in range. For implementing seamless automatic Wi-Fi Offload on desired operator network with Enterprise Wi-Fi Aps, it is important for the WiFi Multi-SIM Connection Manager Client to learn in which slot the right service operator SIM is inserted so that the EAP-AKA authentication is successful with the backend system.

From the above, it is clear that there is a need for novel technique, that can dynamically configure the multi SIM settings for EAP AKA/AKA' connection in different device OEMs and implement an incremental back-off ban on connection attempts in case the device does not support EAP-AKA. In order to overcome the problems stated above and dynamically identify the right SIM, a novel technique is proposed for configuring the multi SIM settings for EAP AKA/AKA' connection in different device OEMs and implementing an incremental back-off ban on connection attempts in case the device does not support EAP-AKA.

The present disclosure relates to a method and system that provides a novel method that can dynamically configure the multi SIM settings for EAP AKA/AKA' connection in different device OEMs while connecting to Service provider's Enterprise Wi-Fi AP network that will increase the likelihood for automatic Wi-Fi offload on operator network and enhance user customer experience in a heterogeneous network. For differentiating the enhancement described here to enable automated Wi-Fi offload on Multi-SIM devices, from the standard ANDSF functionality, we term the client in this embodiment as 'Wi-Fi Multi-SIM Connection Manager Client'. This client will have enhancement to overcome the limitations highlighted above with the standard ANDSF functionality.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a method and system for automatically offloading a user device to at least one wireless access point. Another object of the present disclosure is to provide a novel method where the identification and connection to parent Service Provider's Enterprise Wi-Fi access by using service provider SIM in Multi-SIM devices in case of EAP-AKA/AKA' authentication is done automatically. Another object of the present disclosure is to provide a novel mechanism to automatically offload via Wi-Fi Multi-SIM Connection Manager Client in multi SIM devices to service provider's Enterprise Wi-Fi access network, which has a huge market volume.

Yet another object of the present disclosure is to provide a novel mechanism to gracefully handle scenarios where multi SIM devices do not support EAP-AKA authentication mechanism. Yet another object of the present disclosure is to provide a novel mechanism to analyze the methods which includes tagging relevant fields and structure alignment of EAP-AKA/AKA' Wi-Fi configuration for different devices. Yet another object of the present disclosure is to provide a method that can be used across device vendors in a Heterogeneous Network for multi-sim devices. Another object of the present disclosure is to provide a novel mechanism to provide periodic feedback of relevant methods used for EAP-AKA Wi-Fi configuration corresponding to different devices. Another object of the present disclosure is to provide a novel mechanism to provide appropriate Wi-Fi configuration and attempt connection to Service Provider's Enterprise Wi-Fi AP using one of the methods for successful connection. Another object of the present disclosure is to implement ban duration for anomalous devices which do not handle EAP-AKA authentication properly.

Another object of the present disclosure is to provide a novel mechanism to improve probability of Wi-Fi offload to user's preferred network for providing data/voice offload. Yet another object of the present disclosure is to increase the Wi-Fi offload during the peak consumption hours by leveraging the use of the Enterprise Wi-Fi AP/Home Gateways connected to ONTs radiating Enterprise Wi-Fi SSID. for offloading LTE/cellular network traffic to Wi-Fi at office/home for multi-sim devices. Yet another object of the present disclosure is to use service operator SSIDs configured on enterprise Wi-Fi APs in outdoor locations like Bus Stops, Malls, Schools, and Colleges etc. for multi-sim devices. Yet another object of the present disclosure is to use Enterprise Wi-Fi SSIDs on standalone Wi-Fi Access points to offload LTE/cellular network traffic during day time and night hours, when most of the users are at home for multi-sim devices. Yet another object of the present disclosure is to provide solution that can discover dynamically service operator Wi-Fi access network in its vicinity and selects the preferred network based on dynamic policies for multi-sim devices. Yet another object of the present disclosure is to provide solution that maximizes the Wi-Fi offload opportunity in operator network by evaluating Wi-Fi offload criteria based on both managed SSID defined in policy as well as the SSIDs identified by learning method for multi-sim devices.

Yet another object of the present disclosure is to provide an efficient and effective novel mechanism of offloading in heterogeneous networks for multi-sim devices.

Yet another object of the present disclosure is to provide users with the enhanced experience in high density areas, such as shopping malls, airports, railway/bus stations, colleges, etc. situated within a Hetnet coverage area for multi-sim devices. Yet another object of the present disclosure is to provide coverage in area with dead-spots, or areas with low macro signal strength, such as indoor establishments or peripheral locations within a Hetnet coverage area for multi-sim devices. Yet another object of the present disclosure is to provide users with the features and ability to receive seamless services simultaneously or sequentially consequently without any latency and call drops for multi-sim devices. Yet another object of the present disclosure is to provide features and ability to handle high volume calls and sessions concurrently for multi-sim devices.

In order to achieve the aforementioned objectives, the present invention provides a method and system for automatically offloading a user device to at least one wireless access point in multi-SIM devices. A first aspect of the present invention relates to a method for automatically offloading a user device to at least one wireless access point. The method comprises receiving, at an offloading module, a selection to establish a connection between a user device and the at least one wireless access point, wherein the selection further comprises of a connection type. Next, a learning module detects one or more parameters associated with at least one SIM slot of the user device based on the connection type. Further, the learning module transmits the detected one or more parameters to a method selection module at a network server. Subsequently, the method selection module determines a connection method for the user device based on at least the one or more parameters. Next, the method selection module transmits one or more second parameters associated with the connection method for the user device to a WiFi configuration and connection module. Lastly, the WiFi configuration and connection module automatically offloads the user device onto the at least one wireless access point based on at least the one or more second parameters.

Another aspect of the present invention relates to a system for automatically offloading a user device to at least one wireless access point. The system comprises of a WiFi configuration and connection module, a method selection module, a learning module and the offloading module. The offloading module is configured to receive a selection to establish a connection between a user device and the at least one wireless access point, wherein the selection further comprises of a connection type. The learning module configured to detect one or more parameters associated with the at least one SIM slot of the user device based on at least the connection type, and to transmit the detected one or more parameters to a method selection module at a network server. The method selection module is configured to determine a connection method for the user device based on at least the one or more parameters, and transmit one or more second parameters associated with the connection method for the user device to a WiFi configuration and connection module. The WiFi configuration and connection module configured to automatically offload the user device onto the at least one wireless access point based on at least the one or more second parameters.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

The foregoing shall be more apparent from the following more detailed description of the disclosure.

DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above.

Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment (UE)", "mobile station", "phone", "mobile phone", "smart computing device", "user device", "user equipment", "mobile subscriber station," "access terminal," "terminal," "handset," and similar terminology refers to any electrical, electronic, electro-mechanical or an equipment or a combination of one or more of the above devices. Smart computing devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked device that can be operated autonomously. A smart computing device is one of the appropriate systems for storing data and other private/sensitive information. The smart computing device operates at all the seven levels of ISO reference model, but the primary function is related to the application layer along with the network, session and presentation layer. The smart computing device may also have additional features of a touch screen, apps ecosystem, physical and biometric security, etc. Further, the foregoing terms are utilized interchangeably in the subject specification and related drawings.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, "cellular data" or "cellular data/voice" comprises at least one of a cellular data and a cellular voice data.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

Hereinafter, exemplary embodiments of the present disclosure will be described in detail with reference to the accompanying drawings so that those skilled in the art can easily carry out the present disclosure.

The present invention provides a system and a method for WiFi offloading in multi SIM devices. Particularly, the present invention provides a system and a method for configuring the multi SIM settings for EAP AKA/AKA' connection in different user devices for increasing the likelihood for automatic Wi-Fi offload on service operator network in multi-SIM devices. A learning module learns the SIM slot ID of the inserted desired operator, the structure alignment and field information, wherein feedback of the learnt information is provided to the network server. A method selection module analyzes the structure alignment and field information for mapping unique connection methods to different devices. A WiFi configuration and connection module uses appropriate WiFi configuration and attempts connection to desired Service Providers enterprise Wi-Fi AP using the determined connection method. The present invention also provides a method of implementing an incremental ban on connection attempts in case the user device does not support EAP-AKA. The method is primarily based on the user equipment Wi-Fi capability either in 2.4 GHz, 5 GHz, so that it can perform and collect WLAN measurements in its vicinity according to certain pre-configured parameters.

Figure 1:
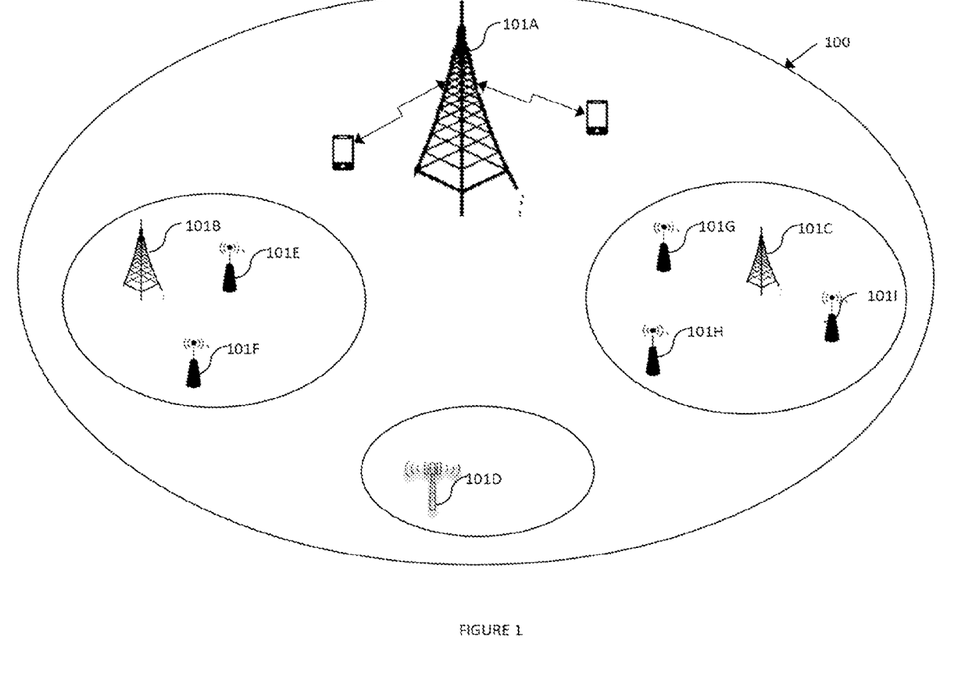
FIG. 1 illustrates an exemplary heterogeneous network [100].

Referring to FIG. 1 illustrates an exemplary block diagram representation of a heterogenous communication network architecture [100], in accordance with exemplary embodiments of the present invention. As shown in FIG. 1, the heterogenous wireless communication network [100] comprises of a macro base station [101A] wide area overlay mobility coverage, and one or more micro base station [101B, 101C] further connected to Wi-Fi access points [101E, 101F, 101G, 101H, 101I], and a micro base station [101D] with built-in Wi-Fi access point capability. The wireless communication network may include a local wireless communication site (or base station), which can use a licensed radio spectrum operated and controlled by a wireless service provider. In another instance of the present invention, the network may be a wired network, a wireless network, or a combination thereof. The network may be a single network or a combination of two or more networks.

Figure 2:
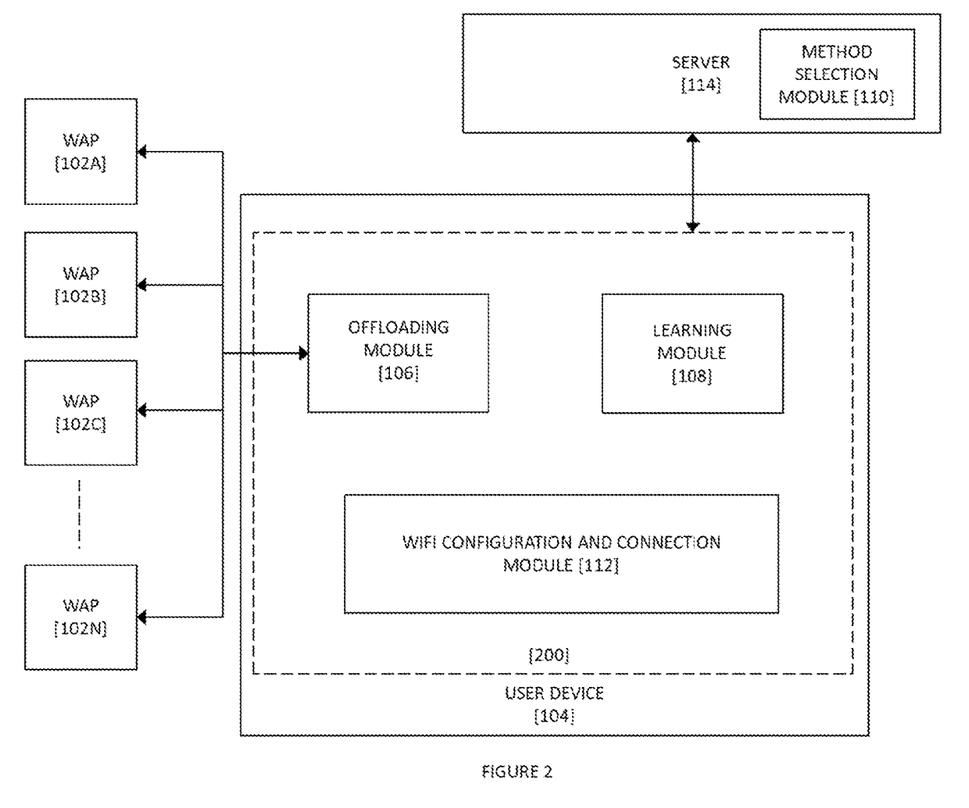
FIG. 2 illustrates an exemplary block diagram of a system [200] for automatically offloading a user device to at least one wireless access point, in accordance with exemplary embodiments of the present invention.

Referring to FIG. 2 illustrates an exemplary block diagram of a system [200] for automatically offloading a user device to at least one wireless access point, in accordance with exemplary embodiments of the present invention. The system [200] comprises of a WiFi configuration and connection module [112], a learning module [108] and an offloading module [106]. The system [200] is further connected to at least wireless access point (WAP) [102], user device [104] and a network server [114]. The network server [114] further comprises of a method selection module [110]. The said components are connected to each other and work in conjunction to achieve the objectives of the present invention.

The offloading module [106] is connected to the WiFi configuration and connection module [112] The offloading module [106] is configured to receive a selection to establish a connection between a user device [104] and the at least one wireless access point [102], wherein the selection further comprises of a connection type. In an instance the present invention encompasses that the connection type is based on at least Extensible Authentication Protocol.

The learning module [108] is connected to the method selection module [110]. The learning module [108] is configured to detect one or more parameters associated with the at least one wireless access point [102] based on at least the connection type. The learning module [108] is further configured to transmit the detected one or more parameters to a method selection module [110] at a network server. For instance, the one or more parameters comprises at least one of a structure information and a field information associated with at least one SIM slot of the user device.

For instance, the present invention encompasses that the learning module [108] obtains SIM slot ID, field information and the structural alignment for the SIM slot upon a user inserting desired operators SIM in phone. The said one or more parameters are extracted either manually from the user device by performing a manual connection on the enterprise Wi-Fi SSID using device settings GUI or automatically where the learning module [108] automatically learns the necessary information when user connects to desired enterprise Wi-Fi AP and provides this information to the server [114].

In an instance, the present invention encompasses that in an event the user device [104] comprises of two or more SIM slots and the at least one wireless access point [102] is associated with the one or more SIM slots, the learning module [108] is configured to detect one or more parameters associated with the two or more SIM slots based on at least an identifier of the SIM slot associated with the at least one wireless access point [102].

The method selection module [110] is connected to the learning module [108] and the WiFi configuration and connection module[112]. The method selection module [110] is configured to determine a connection method for the user device [104] based on at least the one or more parameters. The method selection module [110] is further configured to transmit one or more second parameters for the user device [104] to a WiFi configuration and connection module [112]. For instance, the one or more second parameters comprises at least a policy associated with determined connection method.

The present invention further encompasses that the method selection module [110] determines the one or more second parameters for the user device [104] based on at least a type information of the user device [104]. Furthering the previous instance, the method selection module [110] analyses all relevant field values and structure alignment for the preferred SIM slot and maps unique method to different user devices identified during learning process. In event the connection method opted by the OEMs are same, all the user devices using same field values and structure alignment will use same connection method and shall be associated with the discovered method. The feedback corresponding to the determined connection method learnt by the method selection module [110] is updated periodically and fed back to the system [200] via policy update. The WiFi configuration and connection module [112] is connected to the method selection module [110], and the offloading module [106]. The WiFi configuration and connection module[112] is configured to automatically offload the user device [104] onto the at least one wireless access point [102] based on at least the one or more second parameters. For instance, the WiFi configuration and connection module [112] uses the determined connection method to configure Enterprise SSID. For example, the WiFi configuration and connection module [112] in OS Android uses Android.Net. Similarly, any such client may be used for other types of OS. The Wi-Fi API methods for writing Wi-Fi configuration of the Enterprise Wi-Fi SSID in correct SIM slot is based on the determined connection method. Once the configuration is written, the WiFi configuration and connection module [112] sends attach request to Service Provider's Enterprise Wi-Fi SSID.

The present invention further encompasses that in order to handle the anomalous cases where no connection method has been determined for the user device or EAP handling of the user device is improper, the WiFi configuration and connection module [112] uses a default method with standard structural alignment for the relevant Wi-Fi configuration field and corresponding default values. If the WiFi configuration and connection module [112] detects authentication failure on the Enterprise Wi-Fi SSID using default connection method, the WiFi configuration and connection module [112] is configured to abandon connection attempts on the Enterprise SSID for a finite duration (say 5 minutes approximately). On expiry of this timer, the WiFi configuration and connection module [112] is configured to attempt to reconnect and faces authentication failure again on the same SSID. The WiFi configuration and connection module [112] shall increase the ban delay duration B(i) to a factor of initial ban length as shown below. The Wi-Fi Multi-SIM Connection Manager Client will reset this timer whenever there is a successful connection on Enterprise Wi-Fi AP.

$B(i) = n \times B(0)$

{$B(0)$=Initial ban length (constant);

$B(i)$=Ban length in nth iteration;

$n = \{1, 2, 3 \ldots\}$}

FIG. 1 illustrates only a few units as shown, however, there may be multiple such units or there may be any such numbers of said units, obvious to a person skilled in the art or as required to implement the features of the present disclosure.

Further, the user device [104] refers to a mobility wireless cellular connectivity device having a Wi-Fi capability on both 2.4 GHz and 5 GHz unlicensed bands in addition to a cellular capability. The user device [104] may have an advanced mobile operating system which further combines features of a personal computer operating system with other features useful for mobile or handheld use. The user device [104] can access the Internet, and usually have a touchscreen user interface, also the user device [104] can run third-party applications including the capability of hosting online applications, music players etc. Furthermore, these user device [104] may also be camera smartphone devices, capable of possessing high-speed mobile broadband 4G/5G internet with video calling functionality, hotspot functionality, motion sensors, mobile-payment mechanisms, enhanced security features with alarm and alert in emergencies and other similar functionalities. Also, mobility devices may include smartphones, wearable devices, smart-watches, smart bands, wearable augmented devices, etc.

Also, the user device [104] is further configured to identify, the Wi-Fi Access Point for offloading the cellular data of the user device [104] from the cellular network to the Wi-Fi Access Point. Furthermore, in an implementation the user device [104] is also configured to identify the Wi-Fi Access Point for cellular and WLAN traffic aggregation.

Figure 3:
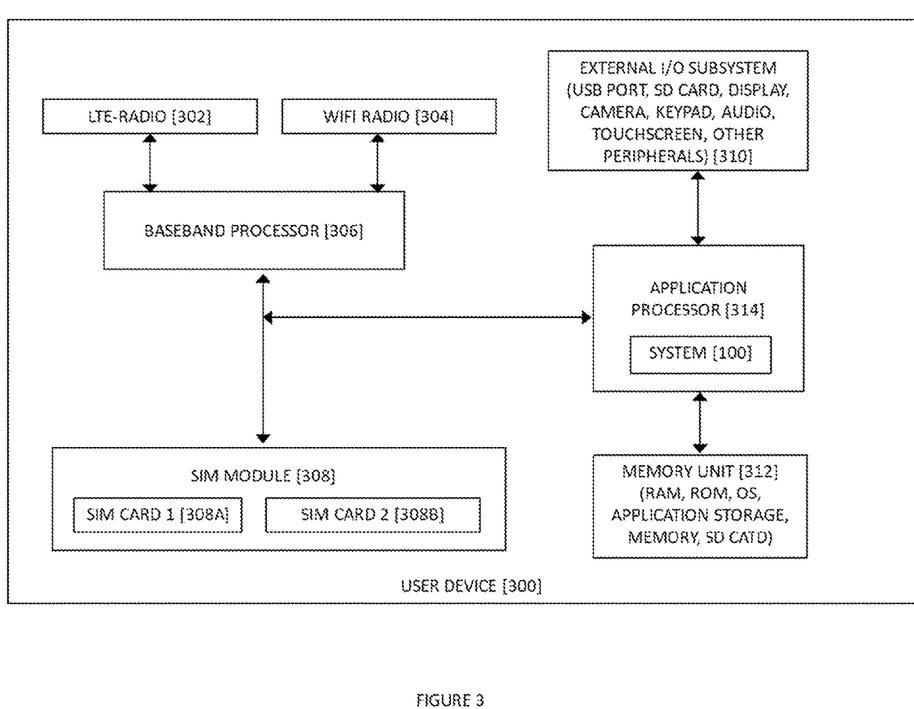
FIG. 3 illustrates an exemplary block diagram of the user device [300], in accordance with exemplary embodiments of the present invention.

Furthermore, FIG. 3 illustrates an exemplary block diagram of the user device [300, 104], in accordance with exemplary embodiments of the present invention. the user device [300] is depicted to have a Wi-Fi capability [304] on both 2.4 GHz and 5 GHz unlicensed bands in addition to a cellular LTE capability [302]. The system [200] is an over the top (OTT) module which resides over the application processor [314] and is responsible for all automatic offload decisions between LTE [302] and Wi-Fi [304] radios. For automatic Wi-Fi offload on Enterprise APs, the system [200] must select the appropriate SIM card i.e. SIM1 [308A] or SIM2 [308A] from SIM module [308]. The diagram also shows high level blocks of other subsystems present in a user device [300] like the baseband processor [306], the memory subsystem [312] as well as external I/O interfaces subsystems [310]. Further, the processor [314, 306]], and the memory [312] are capable of driving one or more modules of the user device [300] to perform their respective function. Also, in FIG. 3 only a few units are shown, however, the user device [300] may comprise multiple such units or the user device [300] may comprise any such numbers of said units, obvious to a person skilled in the art or as required to implement the features of the present disclosure.

The present invention further encompasses that the server may belong to but not limited to any of the network solutions such as access network discovery and selection function (ANDSF), an LTE WLAN Aggregation (LWA), a License Assisted Access (LAA) and an LTE WLAN Radio Level Integration with IPsec Tunnel (LWIP). In an instance, where the server unit [114] is an ANDSF server installed at a service provider's network entity, the server unit [114] may further comprise an ANDSF Quality Server, an ANDSF Policy server and a notification server such as GCM/FCM/APNS Push Notification Server. Also, the system [200] receives at the user device [104], from the server unit [114], one or more ANDSF server defined priorities assigned to one or more Wi-Fi Access Point(s), to manage parent service provider's Wi-Fi Access Point(s) for offloading.

Figure 6:
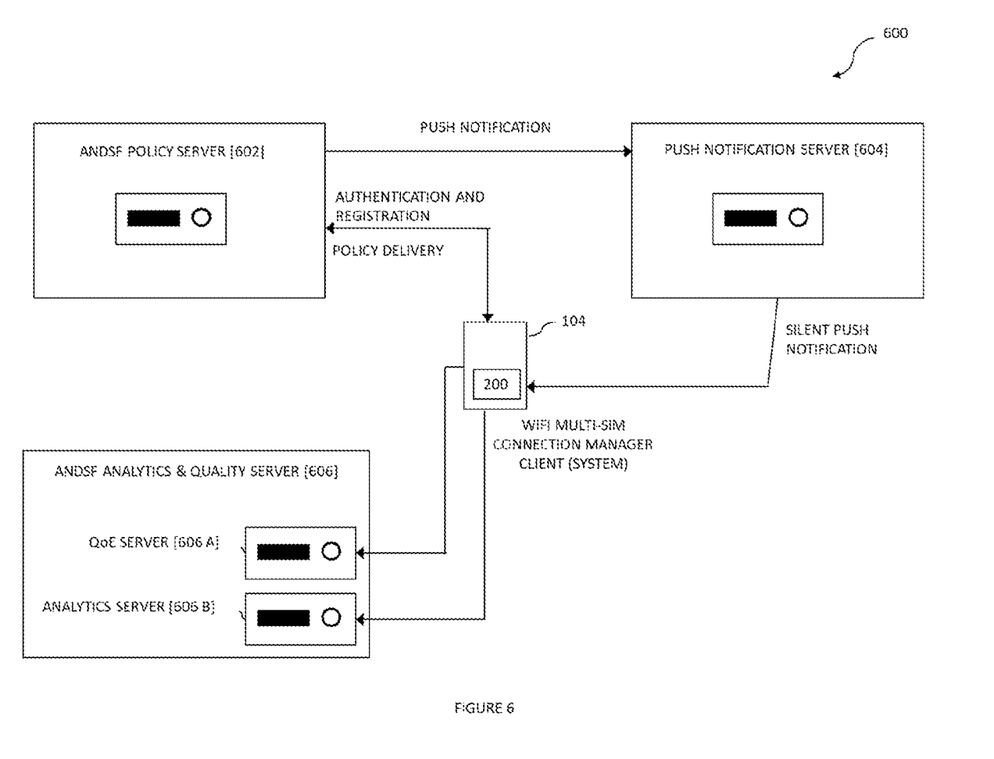
FIG. 6 illustrates an exemplary block diagram illustrating an implementation of an interconnection between a user device, an ANDSF policy server, a push notification server and an ANDSF analytics and quality server, in accordance with exemplary embodiments of the present invention.

Referring to FIG. 6 illustrates an exemplary block diagram illustrating an implementation of an interconnection between a user device, an ANDSF policy server, a push notification server and an ANDSF analytics and quality server, in accordance with exemplary embodiments of the present invention. Further, the ANDSF policy server [602], the push notification server [604] and the ANDSF analytics and quality server [606] may be a part of the sever unit [604] implemented at the parent service provider's network entity. The ANDSF analytics and quality server [606] further comprises a QoE server [606 A] and an analytics server [606 B]. Also, as indicated in the FIG. 6, the user device [104] comprising the system [200] is connected to the ANDSF policy server [602], the push notification server [604] and the ANDSF analytics and quality server [606].

Further, in an instance when the Wi-Fi Multi-SIM Connection Manager Client of the system [200] is initiated at the user device [104], one or more unique credentials of the user device [104] for registration and authentication with the ANDSF policy server [602], are transmitted from the system [200] to the ANDSF policy server [602]. Further, if in an event the registration and authentication are successful, the system [200], fetches one or more public land mobile network (PLMN) details from the user device [104] and thereafter communicates these PLMN details to the ANDSF policy server [602], for fetching one or more policies. Thereafter, the system [200] receives from the server unit [114] (i.e. the ANDSF policy server [602]), the one or more policies comprising details such as priorities assigned to one or more Wi-Fi Access Point(s) Also, the authentication method used by the system [200] can either be EAP-AKA based in case of enterprise Wi-Fi or WPA2 based in case of service provider's Wi-Fi access networks in customer's premises where customer may have defined a customized SSID on the Wi-Fi AP provided by the service provider.

Further, in addition to Wi-Fi signal thresholds, the system [200] also monitors Quality of Experience (QoE) to take appropriate offload decisions. While on operator Wi-Fi, the system [200] is configured to measure backhaul quality with the QoE server [606 A], in operator network/parent service provider's network. Also, in an event, if the quality conditions become poor, the system [200] disconnects a Wi-Fi connection by turning off a Wi-Fi module at the user device [104], and thereafter the system [200] connects the user device [104] to an LTE/cellular network. Further, the system [200] also uploads certain analytics KPIs on the analytics server [606 B], in order to monitor a subscriber base. Furthermore, the push notification server [604], such as GCM/FCM/APNS server, is integrated with ANDSF policy server [602] and is configured to push one or more silent notifications to the system [200], to dynamically update policies for the system [200].

Figure 7:
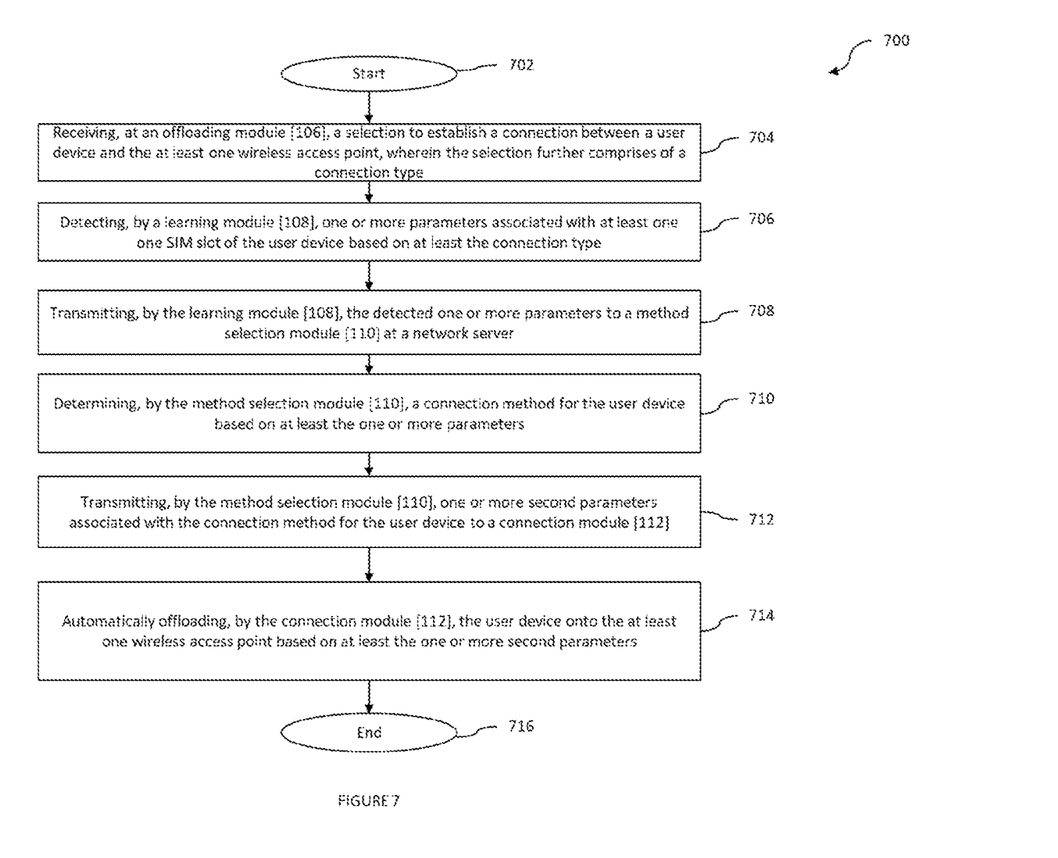
FIG. 7 illustrates an exemplary method flow diagram depicting a method [600], for automatically offloading a user device to at least one wireless access point, in accordance with exemplary embodiments of the present invention.

Referring to FIG. 7 illustrates an exemplary method flow diagram depicting a method [700], for automatically offloading a user device to at least one wireless access point, in accordance with exemplary embodiments of the present invention. As shown in FIG. 7, the method begins at step [702]. The method comprises receiving, at an offloading module [106], a selection to establish a connection between a user device [104] and the at least one wireless access point [102], wherein the selection further comprises of a connection type at step [704]. In an instance the present invention encompasses that the connection type is based on at least Extensible Authentication Protocol.

Next, at step [706], the method comprises that the learning module [108] detects one or more parameters associated with at least one SIM slot of the user device [104] based on at least the connection type. For instance, the one or more parameters comprises at least one of a structure information and a field information associated with the selected SIM slot of the user device [104].

Further, at step [708], the learning module [108] transmits the detected one or more parameters to a method selection module [110] at a network server. Next, at step [710], the method selection module [110] determines a connection method for the user device [104] based on at least the one or more parameters. Further, at step [712], the method selection module [110] transmits one or more second parameters associated with the determined connection method for the user device [104] to a WiFi configuration and connection module [112]. In an instance, the one or more second parameters comprises at least a connection policy associated with the determined connection method. In another instance, the method selection module [110] determines the one or more second parameters for the user device [104] based on at least a type information of the user device [104]. Next, at step [714], the WiFi configuration and connection module [112] automatically offloads the user device [104] onto the at least one wireless access point [102] based on at least the one or more second parameters. The method completes at step [716].

The present invention encompasses that in an event the user device [104] comprises of two or more SIM slots and the at least one wireless access point [102] is associated with the two or more SIM slots, the learning module [108] is configured to detect one or more parameters associated with the two or more SIM slots based on at least an identifier of the SIM slot associated with the at least one wireless access point [102].

The present invention further encompasses that in an event no connection method is determined for the user device, the method further comprises automatically offloading, by the WiFi configuration and connection module [112], the user device onto the at least one wireless access point based on at least the one or more second parameters associated with a default connection method. Next, the method comprises authenticating, by the at least one wireless access point, the user device based on the default connection. Further, the method comprises transmitting, by the WiFi configuration and connection module [112], an attach request to the at least one wireless access point based on a ban delay duration in event of a failure of the authentication, wherein the ban delay duration is increased iteratively in event of one or more failures of the authentication.

Figure 8:
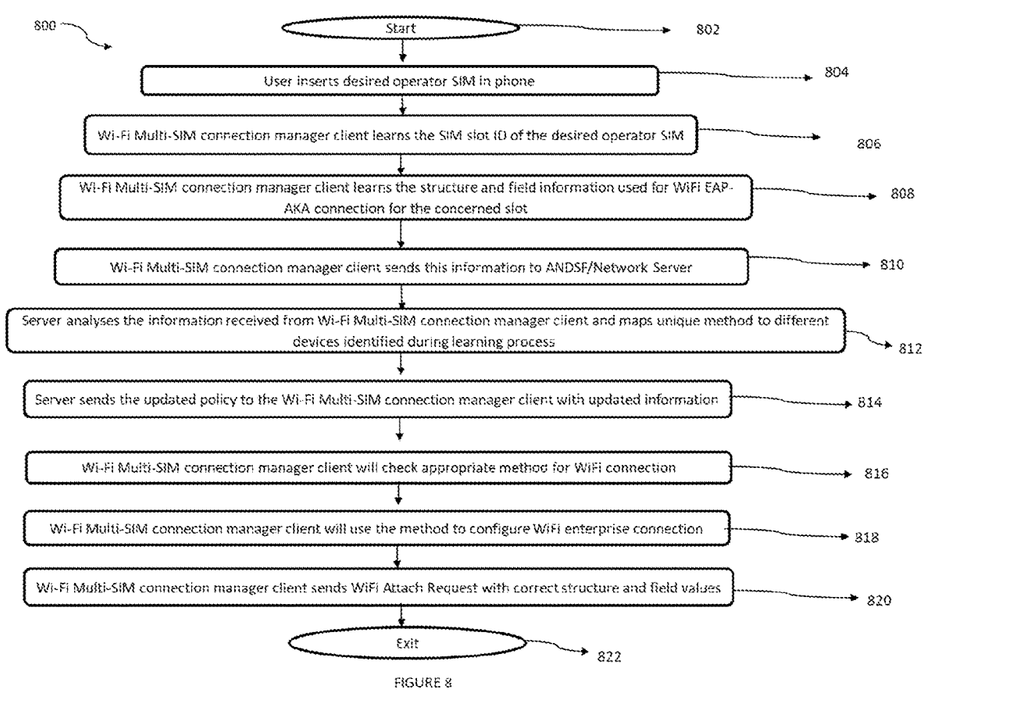
FIG. 8 illustrates an exemplary flow diagram depicting an exemplary implementation of the process of automatically offloading a user device to at least one wireless access point, in accordance with exemplary embodiments of the present invention.

Referring to FIG. 8 illustrates an exemplary flow diagram depicting an exemplary implementation of the process of automatically offloading a user device to at least one wireless access point, in accordance with exemplary embodiments of the present invention. The method begins at step [802]. At step [804], an end user with multiple SIM inserts at least one SIM and turns on the user device Wi-Fi and selects a Service Provider Enterprise SSID to which the user wishes to connect.

At step [806], Wi-Fi Multi-SIM connection manager client [200] comprising of the learning module learns the SIM slot ID of the desired operator. At step [808], the Wi-Fi Multi-SIM connection manager client learns the structure and field information used for WiFi EAP-AKA connection for the concerned slot. At step [610], the Wi-Fi Multi-SIM connection manager client sends this information to ANDSF/Network Server.

At step [812], the ANDSF Server analyses the information received from Wi-Fi Multi-SIM connection manager client and maps unique method to different devices identified during learning process. At step [814], ANDSF Server sends the updated policy to the Wi-Fi Multi-SIM connection manager client with updated information. At step [816], the Wi-Fi Multi-SIM connection manager client will check appropriate method for WiFi connection. At step [818], the Wi-Fi Multi-SIM connection manager client uses the appropriate method to configure WiFi enterprise connection. At step [820], the Wi-Fi Multi-SIM connection manager client sends WiFi Attach Request with correct structure and field values. Thereafter, the method completes at step [822].

As is evident from the above disclosure, the present disclosure provides a novel method and system to for automatically offloading a user device to at least one wireless access point for increasing the likelihood for automatic Wi-Fi offload on service provider network and enhancing customer experience to dynamically offload a user equipment. Furthermore, the present invention also enables each Wi-Fi Multi-SIM connection manager client at the user equipment to locally manage the non-Enterprise Wi-Fi SSIDs within the parent Service Provider Network. The present disclosure thereby overcomes the limitations of the existing solutions.

Also, it is pertinent to note that while the novel technique described in this disclosure has been used to enhance the Wi-Fi offload solution as one of the applications, it is in no way limited to Wi-Fi offload only. Since the technique builds over and above the standard ANDSF functionality without using any of the underlying protocol of the ANDSF, it is independent of ANDSF and therefore can be applied equally well to general non-Enterprise Wi-Fi discovery and automated connection management solutions. It is also applicable to Cellular and WLAN link/traffic aggregation solutions that may require the discovery of non-Enterprise SSIDs belonging to a Service Provider's Wi-Fi Network for enabling link/traffic aggregation using technologies such as License Assisted Access (LAA), LTE-WLAN aggregation (LWA), LTE WLAN integration with IPSec tunnel (LWIP) and other such technologies.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for automatically offloading a user device to at least one wireless access point, the method comprising:

receiving, by a user device, a selection to establish a connection between the user device and the at least one wireless access point, wherein the selection further comprises a connection type;

detecting, by the user device, one or more parameters associated with at least one SIM slot of the user device based on at least the connection type;

transmitting, by the user device, the detected one or more parameters to a network server;

after a determination, by the network server, of a connection method for the user device based on at least the one or more parameters, receiving, from the network server, one or more second parameters for the user device based on the determined connection method; and automatically, by the user device, offloading the user device onto the at least one wireless access point based on at least the one or more second parameters.

2. The method as claimed in claim 1, wherein in an event no connection method is determined for the user device, the method further comprises:

automatically offloading the user device onto the at least one wireless access point based on at least the one or more second parameters associated with a default connection method;

authenticating, by the at least one wireless access point, the user device based on the default connection; and transmitting an attach request to the at least one wireless access point based on a ban delay duration in event of a failure of the authentication, wherein the ban delay duration is increased iteratively in event of one or more failures of the authentication.

3. The method as claimed in claim 1, wherein the one or more parameters comprises at least one of a structure information and a field information associated with the at least one SIM slot of the user device.

4. The method as claimed in claim 1, wherein the one or more second parameters comprises at least a connection policy associated with the determined connection method.

5. The method as claimed in claim 1, wherein the network server determines the one or more second parameters for the user device based on at least a type information of the user device.

6. A system for automatically offloading a user device to at least one wireless access point, the system comprising:

the user device, wherein the user device is configured to receive a selection to establish a connection between the user device and the at least one wireless access point, wherein the selection further comprises a connection type;

wherein the user device is further configured to:

detect one or more parameters associated with at least one SIM slot of the user device, and transmit the detected one or more parameters to a network server;

the network server, said network server configured to:

determine a connection method for the user device based on at least the one or more parameters, and transmit one or more second parameters for the user device to the user device based on the determined connection method; and wherein the user device is further configured to automatically offload the user device onto the at least one wireless access point based on at least the one or more second parameters.

7. The system as claimed in claim 6, wherein:

the user device is configured to automatically offload the user device onto the at least one wireless access point based on at least the one or more second parameters associated with a default connection method in an event no connection method is determined for the user device;

the at least one wireless access point is configured to authenticate the user device based on the default connection method; and the user device is configured to transmit an attach request to the at least one wireless access point based on a ban delay duration in event of a failure of the authentication, wherein the ban delay duration is increased iteratively in event of one or more failures of the authentication.

8. The system as claimed in claim 6, wherein the one or more parameters comprises at least one of a structure information and a field information associated with the at least one SIM slot of the user device.

9. The system as claimed in claim 6, wherein the one or more second parameters comprises at least a connection policy associated with the determined connection method.

10. The system as claimed in claim 6, wherein the network server determines the one or more second parameters for the user device based on at least a type information of the user device.

11. One or more non-transitory computer-readable media comprising computer-executable instructions that, when executed, cause a computing system to perform:

receiving, by a user device, a selection to establish a connection between the user device and at least one wireless access point, wherein the selection further comprises a connection type;

detecting, by the user device, one or more parameters associated with at least one SIM slot of the user device based on at least the connection type;

transmitting, by the user device, the detected one or more parameters to a network server;

after a determination, by the network server, of a connection method for the user device based on at least the one or more parameters, receiving, from the network server, one or more second parameters for the user device based on the determined connection method; and automatically, by the user device, offloading the user device onto the at least one wireless access point based on at least the one or more second parameters.

\* \* \* \* \*